US010228061B2

(12) United States Patent
Pekris et al.

(10) Patent No.: US 10,228,061 B2
(45) Date of Patent: Mar. 12, 2019

(54) SEAL ARRANGEMENT

(71) Applicant: ROLLS-ROYCE plc, London (GB)

(72) Inventors: Michael Joseph Pekris, Derby (GB); Felix Francesco Andrea Lepetit, Oxford (GB); Terence Valentine Jones, Oxford (GB)

(73) Assignee: ROLLS-ROYCE plc, London (GB)

( * ) Notice: Subject to any disclaimer, the term of this patent is extended or adjusted under 35 U.S.C. 154(b) by 293 days.

(21) Appl. No.: 15/067,368

(22) Filed: Mar. 11, 2016

(65) Prior Publication Data

US 2016/0265668 A1 Sep. 15, 2016

(30) Foreign Application Priority Data

Mar. 11, 2015 (GB) .................................. 1504101.5

(51) Int. Cl.
*F16J 15/44* (2006.01)
*F16J 15/3292* (2016.01)
(Continued)

(52) U.S. Cl.
CPC ............... *F16J 15/44* (2013.01); *F01D 11/02* (2013.01); *F16J 15/164* (2013.01);
(Continued)

(58) Field of Classification Search
CPC ........ F16J 15/3292; F16J 15/44; F16J 15/164; F16J 15/3412; F02C 7/28; F01D 11/02;
(Continued)

(56) References Cited

U.S. PATENT DOCUMENTS 1,857,961 A 5/1932 Lamb
3,529,905 A * 9/1970 Meginnis .............. B21D 47/00
277/414

(Continued)

FOREIGN PATENT DOCUMENTS

EP 2 827 030 A2 1/2015
GB 2 250 789 A 6/1992

OTHER PUBLICATIONS

Aug. 28, 2015 Search Report issued in British Patent Application No. 1504101.5.

(Continued)

*Primary Examiner* — Nathan Cumar
(74) *Attorney, Agent, or Firm* — Oliff PLC

(57) ABSTRACT

A seal arrangement for effecting a seal between first and second components arranged for relative rotation about a common axis. Seal arrangement includes a first seal surface associated with the first component, and a second seal surface associated with the second component. First and second seal surfaces are presented for air-riding interaction with one another during relative rotation between components such that, in use, a pressure drop is maintained across seal arrangement. First seal surface incorporates a plurality of spaced-apart hydrodynamic lift-generating features and plurality of ventilation recesses, each ventilation recess being interposed between respective pair of lift-generating features, and wherein each ventilation recess has depth measured normal to first seal surface which is greater than maximum dimension of each lift-generating feature measured normal to first seal surface. Seal arrangement may be embodied in compliant filament seal such as a leaf seal or a brush seal.

18 Claims, 5 Drawing Sheets

(51) Int. Cl.
*F01D 11/02* (2006.01)
*F16J 15/16* (2006.01)
*F16J 15/34* (2006.01)

(52) U.S. Cl.
CPC ....... *F16J 15/3292* (2013.01); *F16J 15/3412* (2013.01); *F05D 2220/32* (2013.01); *F05D 2240/57* (2013.01); *F05D 2240/59* (2013.01)

(58) Field of Classification Search
CPC ............. F05D 2220/32; F05D 2240/57; F05D 2240/59
USPC ................. 277/355, 301, 303, 409, 411, 412
See application file for complete search history.

(56) References Cited

U.S. PATENT DOCUMENTS

| | | | | |
|---|---|---|---|---|
| 6,811,154 | B2 | 11/2004 | Proctor et al. | |
| 2004/0155410 | A1* | 8/2004 | Proctor | F16J 15/164 277/409 |
| 2013/0149143 | A1* | 6/2013 | Gibson | F16J 15/164 415/230 |
| 2014/0353925 | A1* | 12/2014 | Oshima | F16J 15/3204 277/552 |

OTHER PUBLICATIONS

Jul. 21, 2016 Office Action issued in Great Britain Patent Application No. 1604086.7.

* cited by examiner

SEAL ARRANGEMENT

The present invention relates to a seal arrangement, and more particularly relates to a seal arrangement for effecting a seal between first and second components arranged for relative rotation about a common axis.

Compliant filament seals may be used to form a seal between two relatively rotating components in order to maintain a relatively high pressure on one side of the seal and a relatively low pressure on the other side of the seal. Accordingly such seals are often installed, for example, in gas turbine engines where it is required to provide a seal between a rotating shaft and a surrounding casing or another coaxial shaft. Leaf seals represent one example of compliant filament seals, but other examples include brush seals, carbon seals, finger seals, compliant plate seals, shingle seals, as will be appreciated by those of skill in the art. Whilst specific reference is made herein to leaf seals, it is to be appreciated that the present invention can be embodied in other types of seal arrangements.

A leaf seal is arranged with a large number of typically rectangular leaves which are held at a defined angle (the "lay angle") to the radial all the way round the seal circumference. The leaves give the seal a low stiffness, and the leaves are packed together such that the total leakage through the seal is reduced. Nonetheless, interleaf gaps do provide the seal with a porous aerodynamic working section.

Leaf seals are at risk of high levels of heat generation and leaf wear under conditions of sustained contact between the leaf seal elements and the rotating shaft. It has therefore been proposed to provide such seals in an air-riding configuration such that the end edges of the leaves adjacent the rotating component are presented with a small air gap therebetween such that the leaves ride on a thin film of lubricating air to inhibit premature contact wear of the leaf seal elements against the surface of the rotating component. It will be understood that the air gap should be as narrow as possible such that air leakage is reduced to the minimal level possible whilst creating the air-riding effect, so as to limit actual leakage across the seal. However, it has been found that it can be difficult to generate sufficient hydrodynamic lift between the leaf pack and the rotating component to provide a satisfactory air-riding cushion between the two, and so leaf seals in their conventional form provide limited potential for the generation of hydrodynamic lift. Conventional leaf seals are thus prone to wear at the tips of the leaves and/or on the surface of the rotating component itself.

This limits the useful life of the leaf seal. Similar problems can also arise with the other types of compliant filament seals mentioned above.

It is a preferred object of the present invention to provide an improved seal arrangement.

The seal arrangement of the present invention may be embodied in a compliant filament seal, such a leaf seal, but may also be embodied in other types of seal arrangement as will be described.

According to a first aspect of the present invention, there is provided a seal arrangement for effecting a seal between first and second components arranged for relative rotation about a common axis, the seal arrangement comprising: a first seal surface associated with the first component, and a second seal surface associated with the second component, said first and second seal surfaces being presented for air-riding interaction with one another during relative rotation between the components such that, in use, a pressure drop is maintained across the seal arrangement; said first seal surface incorporating a plurality of spaced-apart hydrodynamic lift-generating features and a plurality of ventilation recesses, each said ventilation recesses being interposed between a respective pair of lift-generating features, wherein each ventilation recess has a depth measured normal to the first seal surface which is greater than a maximum dimension of each lift-generating feature measured normal to the first seal surface.

Preferably, the depth of each ventilation recess is approximately one hundred times greater than said maximum dimension of the lift-generating features.

Advantageously, each said ventilation recess is provided in the form of a substantially linear groove. However it is to be noted that in other embodiments the ventilation recesses could take different forms.

Conveniently, each said ventilation recess is located immediately adjacent at least one of said lift-generating features between which it is interposed.

Optionally, each said ventilation recess is spaced from at least one of said lift-generating features between which it is interposed.

Advantageously, said lift-generating features include protrusions arranged to protrude from said first seal surface.

Conveniently, wherein said lift-generating features include recesses formed in said first seal surface.

The seal arrangement may be provided in the form of a compliant filament seal having an annular pack of filaments mountable to said second component and extending radially inwardly towards the first component such that ends of the filaments cooperate to define said second seal surface for air-riding interaction with the first seal surface.

Preferably, said lift-generating features extend across substantially the entire axial width of said pack of filaments.

Advantageously, said ventilation recesses extend across substantially the entire axial width of said pack of filaments.

Conveniently, said first and second seal surfaces are arranged in axially facing relation to one another.

Optionally, said first and second seal surfaces are annular, and both said lift-generating features and said ventilation recesses extend generally radially across said first seal surface.

Preferably, said lift-generating features provided in said first seal surface extend across substantially the entire radial extent of said second seal surface.

Advantageously, said ventilation recesses provided in said first seal surface extend across substantially the entire radial extent of said second seal surface.

Conveniently, said first seal surface is provided on a rotor, and said second seal surface is provided on a stator.

Optionally, said first seal surface is defined by the surface of a thin sheet which is attached to said rotor.

According to a second aspect of the present invention, there is provided method of producing a seal arrangement according to the first aspect, wherein the method includes a step of etching said lift-generating features into said first seal surface.

According to a third aspect of the present invention, there is provided a gas turbine engine having at least one seal arrangement according to the first aspect, and which may optionally be produced via the method of the second aspect.

So that the invention may be more readily understood, and so that further features thereof may be appreciated, embodiments of the invention will now be described by way of example with reference to the accompanying drawings in which.

Figure 1:
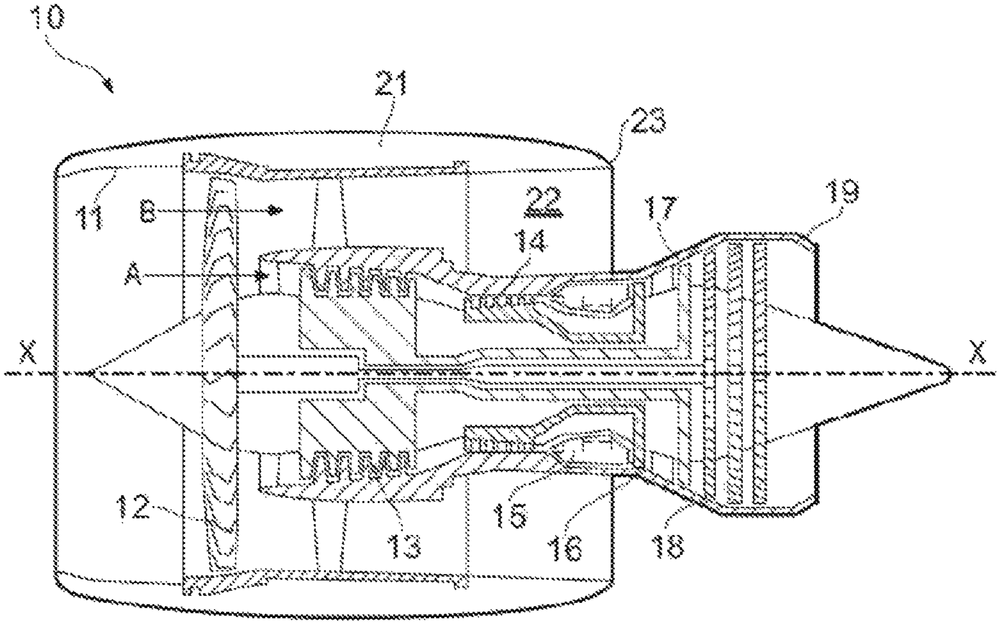
FIG. 1 shows schematically a longitudinal section through a gas turbine engine.

With reference to FIG. 1, a ducted fan gas turbine engine which may incorporate one or more seal arrangements of the present invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The engine may incorporate one or more seal arrangements in accordance with the present invention. For example, the engine may have one or more leaf seals installed, for example, between an interconnecting shaft and a casing for the shaft.

Figure 2:
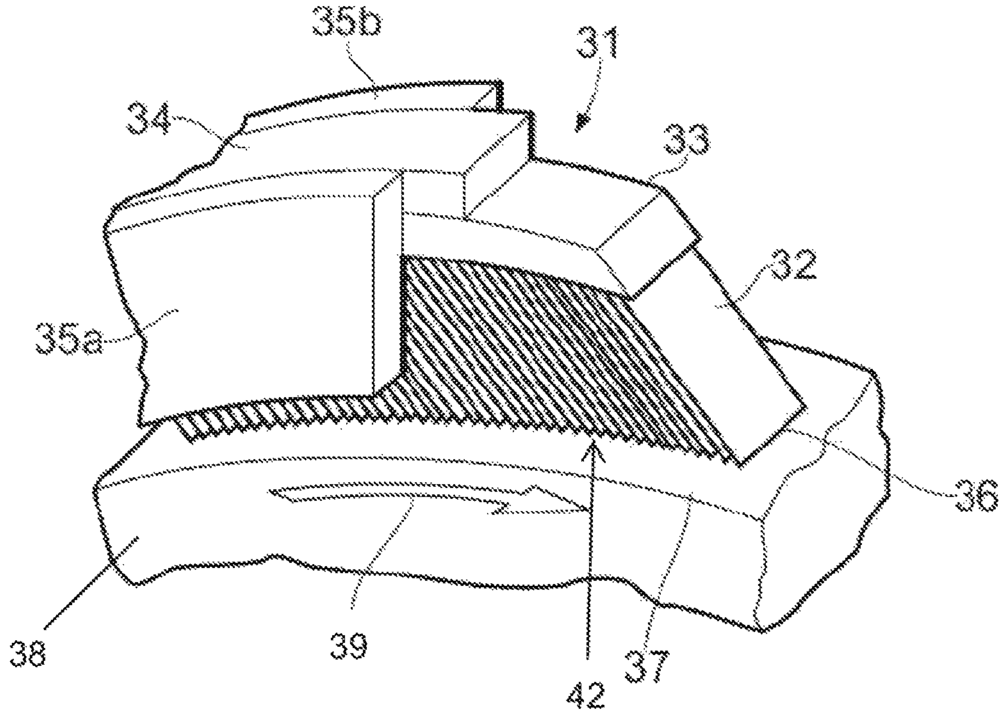
FIG. 2 shows schematically a cut-away perspective view of a portion of a generally conventional leaf seal.
Figure 3:
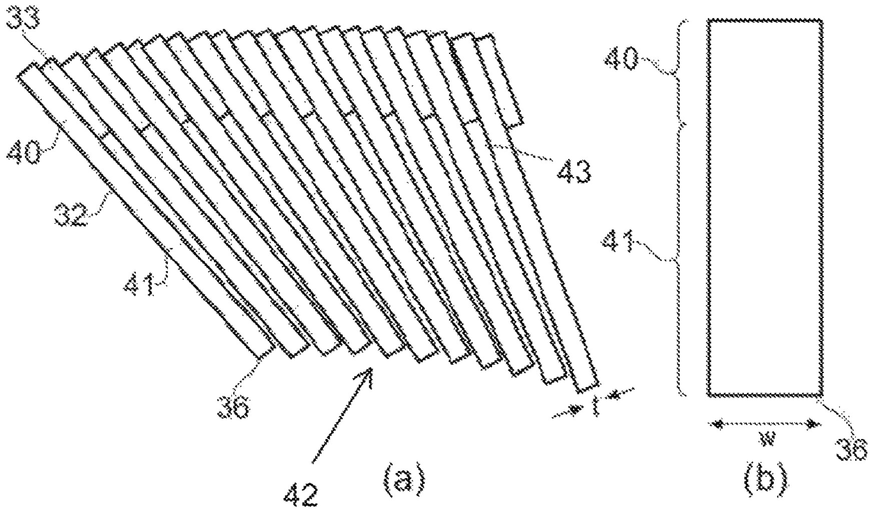
FIG. 3 shows (a) a view along the axial direction of an arc segment of the pack of leaves of the seal of FIG. 1, and (b) a plan view of a single leaf of the seal of FIG. 1.

FIG. 2 shows schematically a cut-away perspective view of a portion of a seal arrangement in the form of a leaf seal 31 comprising a pack of compliant filaments in the form of leaves 32. FIG. 3 shows (a) a view along the axial direction of an arc segment of the pack to better show some of the leaves 32 edge-on, and (b) a plan view of a single leaf 32.

The leaves 32 each have a root portion 40 and a working portion 41, and have a width w in the axial direction and a thickness t. The leaves alternate with spacer elements 33 at their root portions 40, and are secured thereat to a backing ring 34 of a stator housing, which typically also comprises front 35*a* (high pressure side) and rear (low pressure side) 35*b* rigid cover plates.

The working portions 41 of the leaves 32 present end edges 36 towards a first seal surface 37 of a rotating component 38 (shaft or other rotor) generally rotating in the direction depicted by arrowhead 39. More particularly, the end edges 36 of the leaves 32 cooperate to define a second seal surface 42 of annular configuration which is provided in radially facing relation to the first seal surface 37 of the rotor 38. The leaves 32, and in particular the end edges 36 of the leaves 32 and the second seal surface 42 defined thereby, act against the first surface 37 of the rotor 38 in order to create a seal across the assembly 31. It is envisaged that when the rotor 38 is stationary and thus not rotating relative to the second seal surface 42 defined by the ends of the leaves 32, or when the rotor 38 is moving only at slow speed relative to the pack of leaves 32, the second seal surface 42 defined by the end edges 36 of the leaves 32 may lightly touch the first seal surface 37 of the rotor 38 for wiping contact therewith during low-speed rotation.

Each leaf 32 is sufficiently compliant in order to adjust with rotation of the first seal surface 37, so that a good sealing effect is created. The spacers 33 ensure that flexibility is available to appropriately present the leaves 32 towards the first seal surface 37 which, as illustrated, is generally with an inclined angle between them. The spacers 33 also help to form interleaf gaps 43 between adjacent working portions 41 of the leaves 32. A leakage flow through these gaps 43 is induced by the pressure differential across the seal.

During relative rotation between the rotor 38 and the stator housing 34, and hence relative rotation between the first and second seal surfaces 37, 42, the second seal surface 42 runs in close proximity to the first seal surface 37, or even wiping contact therewith during low-speed rotation. The seal surfaces 37, 42 cooperate to provide a seal around the rotor 38 such that a pressure drop is maintained axially across the leaf seal 31.

Figure 4:
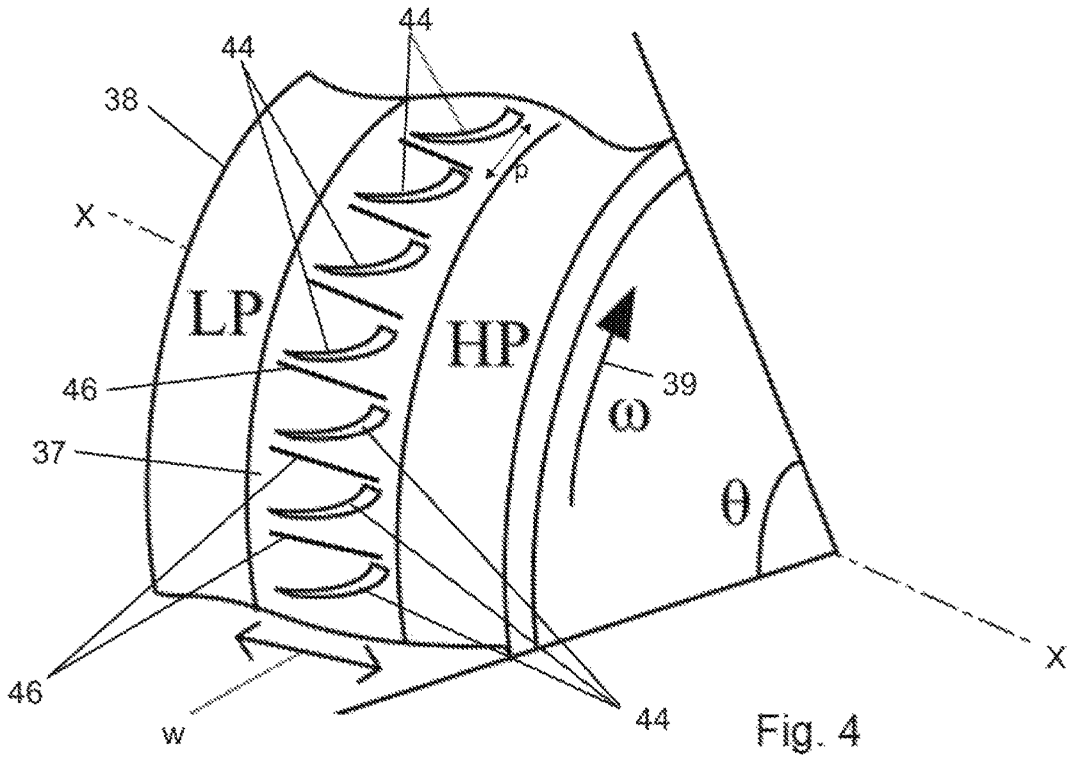
FIG. 4 is a schematic perspective view showing part of a rotor, and in particular a series of hydrodynamic lift-generating features and ventilation grooves formed thereon.

FIG. 4 illustrates a section of the rotor 38, and features of its first seal surface 37 in further detail, with the leaves 32 omitted for the sake of clarity. As will be noted, the rotor 38 is illustrated in a configuration arranged for rotation (in the direction denoted by arrow 39) about an axis X-X. The axial width w of the leaves 32 is shown extending across an axially central region of the rotor surface 37, with the resulting high pressure and low pressure sides of the seal arrangement 31 being denoted by "HP" and "LP" respectively.

In order to provide an improved air-riding function between the leaves 32 and the seal surface 37 of the rotor 38, the surface 37 of the rotor is provided with a plurality of circumferentially spaced-apart hydrodynamic lift-generating features 44 around its periphery. As will be noted, the lift-generating features 44 are provided around the region of the rotor surface 37 against which the ends 36 of the leaves 32 act. In the particular arrangement illustrated in FIG. 4, the lift-generating features 44 are each configured to extend generally axially across the surface 37 by slightly less than the full axial width w of the leaves 32. However, it is envisaged that in other embodiments the lift-generating features will extend axially across substantially the entire axial width w of the leaves 32, for example as illustrated in FIG. 5, or even beyond the axial width w of the leaves 32 so that the features 44 will always be located beneath the end edges 36 of the leaves 32 even in the event that the pack of leaves 32 should become deflected axially relative to the rotor 38.

Figure 5:
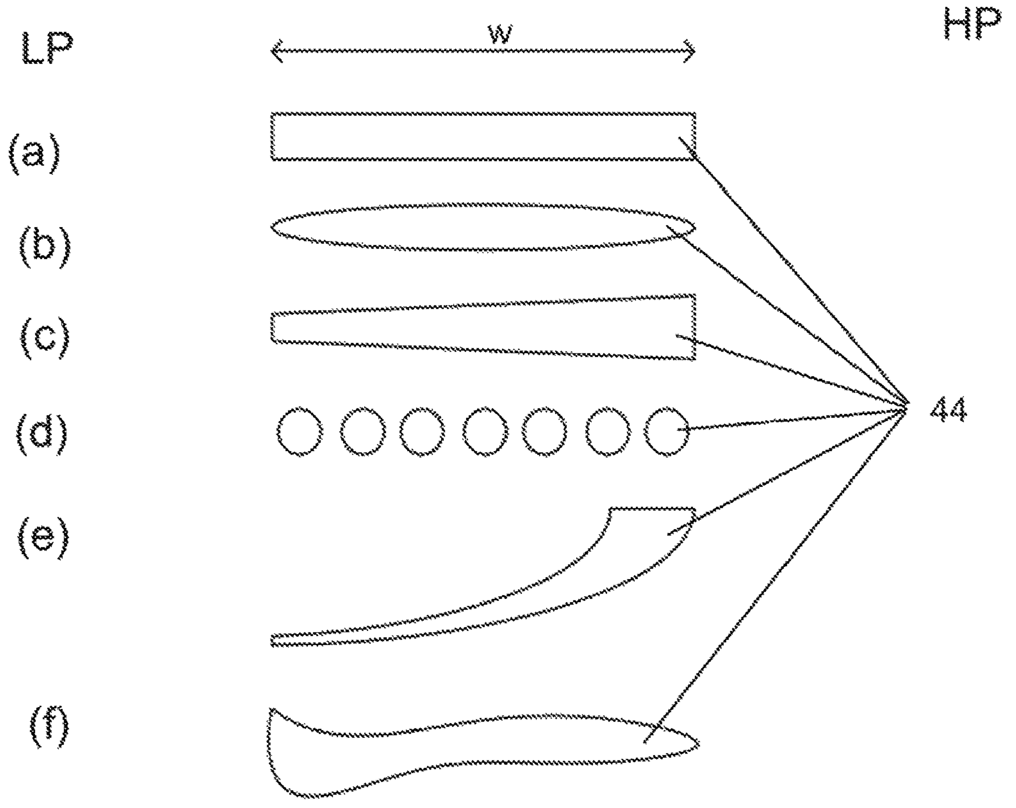
FIG. 5 shows a series of alternative configurations of hydrodynamic lift-generating features which may be used in the present invention, as viewed in a radially inwards direction relative to the rotor.
Figure 6:
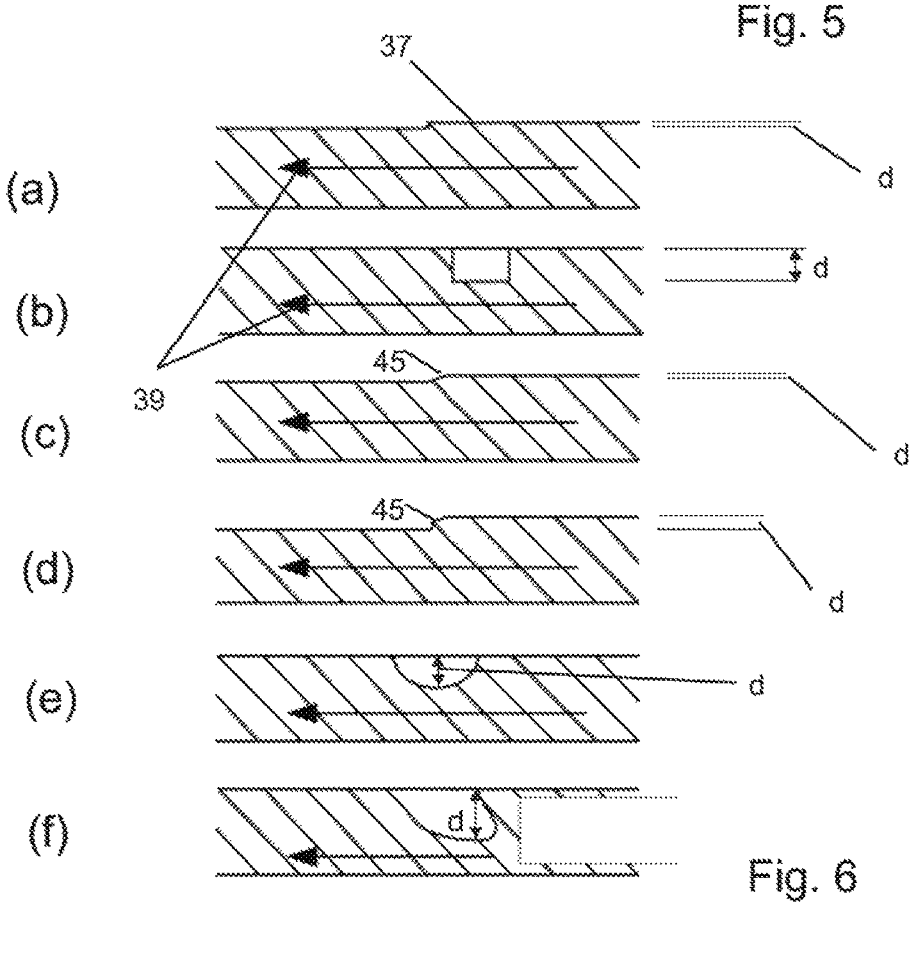
FIG. 6 shows a series of alternative configurations of hydrodynamic lift-generating features which may be used in the present invention, as viewed in transverse cross-section.

The lift-generating features 44 may take various possible forms, some of which are illustrated schematically in FIGS. 5 and 6. It is to be noted, however, that whilst all of the lift-generating features 44 illustrated in FIGS. 5 and 6 are provided in the form of radially inwardly directed recesses formed around the rotor 38, in other embodiments the lift-generating features 44 could take the form of projections configured to protrude radially outwardly from the seal surface 37 as will be described hereinafter.

The lift-generating features 44 are configured to generate lift between the seal surfaces 37, 42 of the rotor 38 and the leaves 32, thereby providing an improved air-riding effect between the leaves 32 and the rotor 38 such that the end edges 36 of the leaves will ride on a thin film of air at small clearances above the rotor surface 37. The exact configuration of the features 44 and their relationship to one another can be configured to the particular operating parameters of any given installation. For example, the pitch p of the features 44, as well as their individual shape and size, can be varied to ensure that the features 44 are appropriate for specific engine applications.

In this regard it envisaged that for advanced types of compliant filament seals having a relatively large number of very thin sealing filaments (e.g. leaves) 32, the air-riding performance of the seal arrangement could be improved (for example in terms of contact force or seal torque reduction) by having a relatively small pitch p between successive lift-generating features 44, in order to ensure a more uniform pressure rise between the sealing elements 32 and the rotor surface 37 is obtained around the circumference of the rotor 38. At relatively low rotational speeds, a shortened pitch p between successive lift-generating features 44 will increase the frequency of high-pressure zones passing beneath each sealing element 32.

FIG. 5(*a*) illustrates a very simple configuration of lift-generating feature 44 which takes the form of a straight elongate groove which is recessed into the rotor 38. The alternative configuration of feature 44 illustrated in FIG. 5(*b*) is provided in the form of an elongate oval-shaped recess, whilst the feature illustrated in FIG. 5(*c*) is provided in the form of an axially tapered groove which it is proposed will be configured to narrow towards the low pressure (LP) side of the seal arrangement.

It is proposed that in some embodiments each of the circumferentially spaced-apart lift-generating features 44 could be discontinuous. For example, FIG. 5(*d*) illustrates a possible configuration in which each feature 44 comprises a plurality of axially spaced-apart recesses.

FIG. 5(*e*) illustrates in more detail the type of lift-generating feature illustrated on the rotor 38 shown in FIG. 4. As will be noted, this configuration of feature 44 is provided in the form of a tapered groove (configured to narrow towards the low pressure side of the seal arrangement) which is also generally arcuate in form. The widest region of the groove is thus arranged to be located towards the high pressure side of the seal arrangement, and also rotationally forwardly of the narrowest region of the groove, as will be noted having regard to the direction of rotation 39 illustrated in FIG. 4.

FIG. 5(*f*) illustrates a more complicated configuration of lift-generating feature 44 which has a shape which is optimised to a specific seal arrangement in order to provide optimum air-riding properties for the anticipated performance characteristics of the seal arrangement.

As indicated above, the various possible lift-generating features 44 may be provided in the form of recesses. FIG. 6 illustrates the cross-sectional profiles of a number of possible configurations of the lift-generating features. Although the depth of each configuration of feature illustrated may vary, it is envisaged that the features will each have a maximum radial depth d, measured normal to the first seal surface 37 of the rotor 38, of less than 10 μm or a few tens of μm. As will therefore be appreciated, the maximum depth of the recessed lift-generating features 44 is very small, and indeed sufficiently small to allow the features 44 to be etched into the surface 37 of the rotor 38. By making the radial depth d of the lift-generating features 44 so small, they will be effective in increasing air pressure locally between the rotor surface 37 and the end edges 36 of the leaves 32, thereby producing lift, without disturbing the operation of the seal arrangement in maintaining a pressure differential across the seal arrangement.

As shown in particular in FIGS. 6(*c*) and 6(*d*) in particular, the lift-generating features 44 can be configured to include a small chamfer or fillet radius 45 to reduce the likelihood of the end edges 36 of the leaves 32 catching on the features 44 as they move therepast which could damage the leaves 32 or cause wear on the lift-generating features 44 themselves.

Having regard again to FIG. 4, it is to be noted that in addition to the circumferentially spaced-apart lift-generating features 44 discussed above, the rotor 38 is also provided with a plurality of ventilation recesses 46. The ventilation recesses 44 are circumferentially spaced-apart from one another around the peripheral seal surface 37 of the rotor 38, and are each interposed between respective pairs of lift-generating features 44. In the particular arrangement illustrated in FIG. 4, the ventilation recesses 46 are each provided in the form of elongate and substantially linear grooves which are provided in the rotor seal surface 37 and which each extend generally axially. It is to be noted, however, that in alternative embodiments the ventilation recesses 46 could take different forms. The ventilation recesses 46 are furthermore shown in an arrangement in which they are each spaced from the two adjacent lift-generating features 44.

In the particular arrangement illustrated in FIG. 4, the ventilation recesses 46 are each configured to extend generally axially across the rotor seal surface 37 by slightly less than the full axial width w of the leaves 32. However, it is envisaged that in other embodiments the ventilation recesses may extend axially across substantially the entire axial width w of the leaves 32 or even beyond the axial width w of the leaves 32 so that the recesses 46 will always be located beneath the end edges 36 of the leaves 32 even in the event that the pack of leaves 32 should become deflected axially relative to the rotor 38.

Importantly, the ventilation recesses 46 are each configured so as to have a depth measured normal to the seal surface 37 (and thus radially in the particular embodiment illustrated in FIG. 4) which is greater than the maximum depth d, also measured normal to the seal surface 37, of the lift-generating features 44. In preferred embodiments the depth of the ventilation recesses 46 will significantly exceed the maximum depth d of the lift-generating features 44, and may be of the order of one hundred times the maximum depth d of the lift-generating features 44.

It has been found that the above-mentioned ventilation recesses 46 interposed between the lift-generating features 44 significantly improve the overall air-riding performance of the seal arrangement 31 by setting boundary flow conditions between the two seal surfaces 37, 42 for more favourable hydrodynamic lift-generating conditions.

Figure 7:
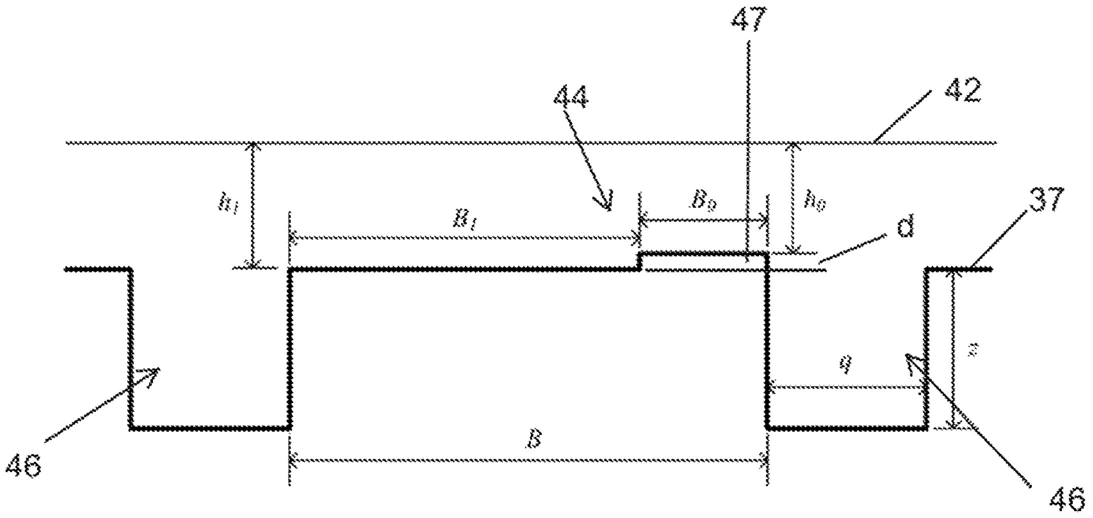
FIG. 7 is a cross-sectional view through part of the rotor, showing an exemplary hydrodynamic lift-generating feature and a pair of cooperating ventilation recesses formed in the surface of the rotor.

Turning now to consider FIG. 7, there is illustrated in enlarged radial cross-sectional view an alternative configuration of successive lift-generating feature 44 and an adjacent ventilation recess 46 provided around the rotor seal surface 37. In particular, it will be noted that the lift-generating features 44 of this embodiment are provided in the form of circumferentially spaced-apart Rayleigh steps formed around the rotor seal surface 37. Each feature 44 thus comprises a small protrusion 47 which protrudes from the rotor seal surface 37 by a distance d which may be between 3 and 4 μm as measured normal to the rotor seal surface 37. As will be noted, in this arrangement each ventilation recess, which may be provided in the form of a groove similar to those illustrated in the arrangement of FIG. 4, is located immediately adjacent a respective lift-generating protrusion 44.

In more detail, one particular embodiment of the type of Rayleigh step arrangement illustrated in FIG. 7 may be configured such that the circumferential separation B between successive ventilation recesses 46 is approximately 2200 μm, with the depth z of each ventilation recess being approximately 300 μm, as measured normal to the rotor seal surface 37. Each ventilation recess 46 may be configured so as to have a circumferential length q of approximately 300 μm, whilst each lift-generating protrusion 47 may have a circumferential length $B_0$ of approximately 500 μm, with circumferential length dimension $B_1$ being approximately 1700 μm.

The circumferential width $B_0$ of each lift-generating protrusion 47 is preferably determined by the size of the end edges 36 of the seal leaves 32, and it envisaged to typically be in the region of 0.03 to 1 mm for seal arrangements having a very high number of individual leaves 32, or in the range of 1 to 100 mm for seals having fewer leaves 32.

In more detail, embodiments of the type illustrated in FIG. 7 are envisaged in which the circumferential step length ratio $B_1/B_o$ for the lift-generating protrusions 47 will be in the range of 0.1 to 10, the normalised ventilation groove depth (z/h) will be in the range of 50 to 200, and the normalised ventilation groove length (q/B) will be in the range of 0.05 to 1. It has been found that this type of arrangement may be effective in providing an air-riding film thickness $h_o$ of between 10 and 500 μm, and an air-riding film thickness ratio $(h_1/h_o)$ of between 1.05 and 10 for a typical seal arrangement.

Figure 8:
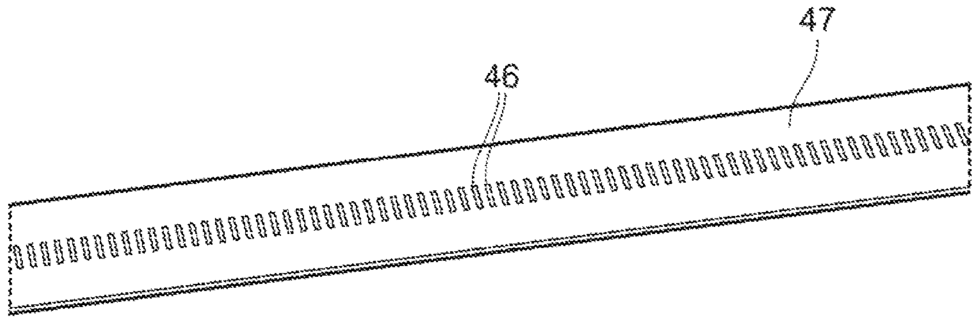
FIG. 8 is a perspective view showing a thin sheet having a series of exemplary ventilation recesses formed therein, which may be affixed to the rotor.

As mentioned above, because the air-riding features 44 are so small in a dimension measured normal to the rotor seal surface 37, it is envisaged that the features 44 may be etched into the seal surface 37. However, because the ventilation recesses 46 are so much deeper, as measured normal to the seal surface 37, it is proposed that the ventilation recesses 46 may be formed in some other way such as, for example, machining or stamping, prior to subsequent etching of the lift-generating features 44. For example, FIG. 8 illustrates a section of a thin and flexible metal sheet having the configuration of an elongate strip or ribbon 47, which has been machined so as to include a plurality of ventilation grooves 46 in spaced-apart relationship along its length. It is proposed that the air-riding features 44, which could take any of the forms mentioned above, can then be etched into the surface of the strip 47, between the ventilation grooves 46, and the strip thereafter wrapped around the main body of a rotor 38 so as to extend around the periphery of the rotor and thereby define the outer seal surface 37 of the rotor.

Whilst the invention has been described above with reference to embodiments in which the air-riding features 44 and the ventilation recesses 46 are provided in a radially outwardly directed seal surface 37 of a rotor 38, for air-riding interaction with an adjacent and radially inwardly directed seal surface 42 defined by the ends 36 of leaves 32 or other compliant filaments provided in an annular pack around the rotor 38, it is to be noted that the invention could be embodied in other types of seal arrangement. For example, embodiments are envisaged in which an annular pack of leaves 32 or other compliant filaments supports a series of seal elements around the rotor 38, the seal elements cooperating to forms an annulus around the rotor 38 such that each seal element defines a respective seal surface which is radially inwardly directed and is thus presented for interaction with the outer surface 37 of the rotor 38 in radially facing relation thereto. In this type of arrangement, the air-riding features 44 and the ventilation recesses 46 could either be provided in the outer surface 37 of the rotor 38 in a similar manner to that proposed above, or could alternatively be provided around the radially inwardly directed surfaces of the seal elements.

Figure 9:
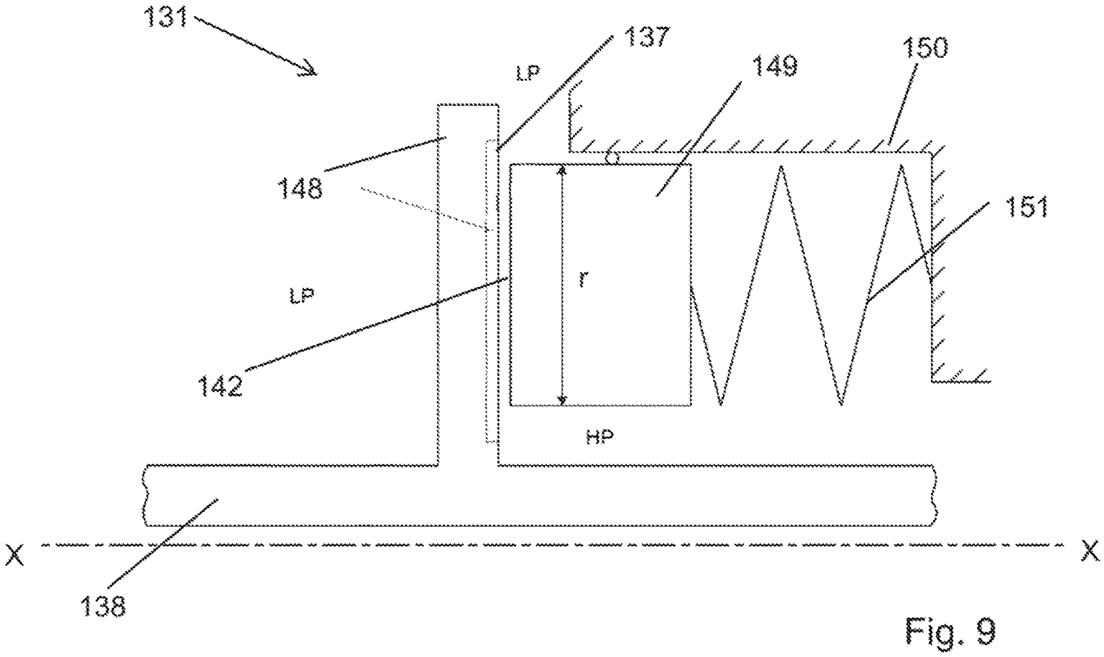
FIG. 9 is a schematic cross-sectional view through an alternative configuration of seal arrangement having a pair of axially facing seal surfaces.
Figure 10:
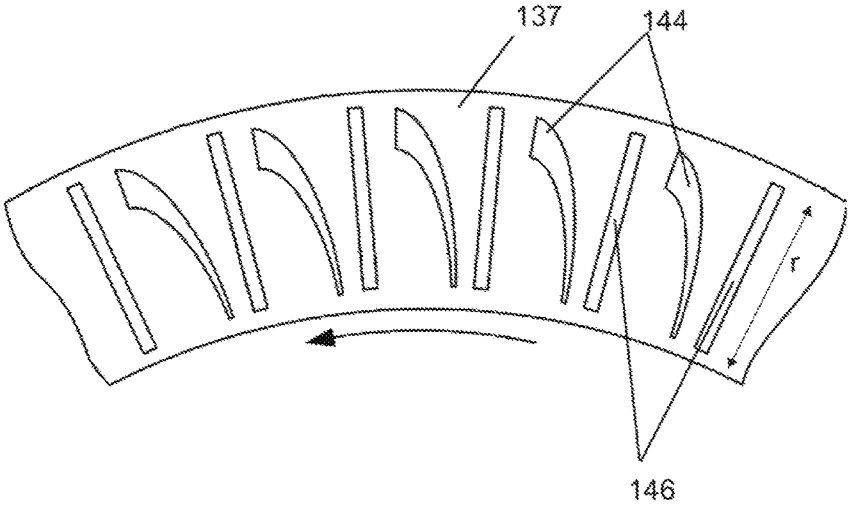
FIG. 10 is an axial view showing one of the seal surfaces of the arrangement of FIG. 9, the seal surface having a series of hydrodynamic lift-generating features and ventilation recesses formed therein.

Turning now to consider FIGS. 9 and 10, there is illustrated another configuration of seal arrangement 131 in which the present invention could be embodied. In this type of arrangement the two seal surfaces are arranged in axially facing relation to one another rather than the radially facing relation of the embodiments described above and illustrated in FIGS. 2 to 8. More particularly, in the arrangement of FIGS. 9 and 10 it will be noted that the rotor 138 includes a generally radially extending flange 148 which defines a generally planar and radially extending annular rotor seal surface 137. Axially adjacent the flange 148, there is provided an annular seal element 149 which is mounted to a stator 150 so as to extend around the rotor 138, and which defines a generally planar and radially extending annular stator seal surface 142 which is thus provided in axially facing relation to the rotor seal surface 137. As illustrated schematically in FIG. 9, the annular seal element 149 may be mounted to the stator 150, for example via a spring arrangement 151, in a manner effective to be axially biased towards the rotor flange 148.

FIG. 10 represents a schematic illustration of a sector of the rotor seal surface 137, as viewed from the position of the seal element 149. As will be noted, the rotor seal surface 137 is provided with a similar combination of lift-generating features 144 and ventilation recesses 146 to that illustrated in FIG. 4 and described above, although in the arrangement of FIG. 10 the lift-generating features 144 and the ventilation recesses 146 are arranged to extend generally radially across the rotor seal surface 137 rather than axially as in the arrangement of FIG. 4.

As illustrated in FIG. 10, the lift-generating features 144 and the ventilation recesses 146 may both be configured so as to extend across the rotor seal surface 137 by substantially the entire radial extent r of the stator seal surface 142 so that they will always be located between the two axially facing seal surfaces 137, 142 even in the event that the seal surfaces 137, 142 become deflected radially relative to one another. However, in other embodiments it is possible for the lift-generating features 144 and the ventilation recesses 146 to generally axially across the rotor surface 137 by slightly less than the radial extent r of the stator seal surface 142. Alternatively, the lift-generating features 144 and the ventilation recesses 146 can be configured to extend across beyond the radial extent of the stator seal surface 142.

It is to be appreciated, that any of the other above-described combinations of lift-generating features 44 and ventilation recesses 46 could be used in the arrangement of FIGS. 9 and 10. Furthermore, it is envisaged that the lift-generating features 44 and the ventilation recesses 46 could be provided on the seal surface 142 of the seal element 149 rather than on the seal surface 137 of the rotor 138 as illustrated.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A seal arrangement for effecting a seal between a first component and a second component arranged in relative rotation about a common axis, the seal arrangement comprising:

- a first seal surface formed by a surface of the first component, the first seal surface including: (i) a plurality of spaced-apart hydrodynamic lift-generating features, and (ii) a plurality of ventilation recesses, each of the plurality of ventilation recesses being formed in the first component between a respective pair of lift-generating features of the plurality of lift-generating features, and each of the plurality of ventilation recesses has a depth into the first component, which is measured normal to the first seal surface, that is greater than a maximum dimension of each of the plurality of lift-generating features, which is measured normal to the first seal surface; and
- a second seal surface formed along the second component, the first seal surface and the second seal surface forming a seal therebetween by air-riding relative to one another during relative rotation between the first component and the second component, such that, in use, a pressure drop is maintained across the seal arrangement.

2. The seal arrangement according to claim 1, wherein the depth of each ventilation recess is approximately one hundred times greater than the maximum dimension of each of the plurality of lift-generating features.

3. The seal arrangement according to claim 1, wherein each ventilation recess is a substantially linear groove.

4. The seal arrangement according to claim 1, wherein each ventilation recess is located immediately adjacent to at least one of the plurality of lift-generating features between which the ventilation recess is interposed.

5. The seal arrangement according to claim 1, wherein each ventilation recess is spaced from at least one of the plurality of lift-generating features between which the ventilation recess is interposed.

6. The seal arrangement according to claim 1, wherein the plurality of lift-generating features include protrusions arranged to protrude from the first seal surface.

7. The seal arrangement according to claim 1, wherein the plurality of lift-generating features include recesses formed in the first seal surface.

8. The seal arrangement according to claim 1, wherein the seal arrangement is a compliant filament seal having an annular pack of filaments mountable to the second component and extending radially inward towards the first component, such that ends of the annular pack of filaments cooperate to define the second seal surface to provide air-riding interaction with the first seal surface.

9. The seal arrangement according to claim 8, wherein the plurality of lift-generating features extend across substantially an entire axial width of the annular pack of filaments.

10. The seal arrangement according to claim 8, wherein the ventilation recesses extend across substantially an entire axial width of the annular pack of filaments.

11. The seal arrangement according to claim 1, wherein the first seal surface and the second seal surface are arranged in axially facing relation to one another.

12. The seal arrangement according to claim 11, wherein the first seal surface and the second seal surface are annular, and both the plurality of lift-generating features and the ventilation recesses extend radially across the first seal surface.

13. The seal arrangement according to claim 12, wherein the plurality of lift-generating features provided in the first seal surface extend across substantially an entire radial extent of the second seal surface.

14. The seal arrangement according to claim 12, wherein the ventilation recesses provided in the first seal surface extend across substantially an entire radial extent of the second seal surface.

15. The seal arrangement according to claim 1, wherein the first seal surface is provided on a rotor, and the second seal surface is provided on a stator.

16. The seal arrangement according to claim 15, wherein the first seal surface is defined by a surface of a thin sheet attached to the rotor.

17. A method of producing a seal arrangement for effecting a seal between a first component and a second component arranged in relative rotation about a common axis, the seal arrangement including:

- a first seal surface formed by a surface of the first component, the first seal surface including: (i) a plurality of spaced-apart hydrodynamic lift-generating features, and (ii) a plurality of ventilation recesses, each of the plurality of ventilation recesses being formed in the first component between a respective pair of lift-generating features of the plurality of lift-generating features, and each of the plurality of ventilation recesses has a depth into the first component, which is measured normal to the first seal surface, that is greater than a maximum dimension of each of the plurality of lift-generating features, which is measured normal to the first seal surface, and
- a second seal surface formed along the second component, the first seal surface and the second seal surface forming a seal therebetween by air-riding relative to one another during relative rotation between the first component and the second component, such that, in use, a pressure drop is maintained across the seal arrangement, the method comprising:

a step of etching the plurality of lift-generating features into the first seal surface.

18. A gas turbine engine comprising at least one seal arrangement according to claim 1.

* * * * *